Jan. 23, 1940.   J. M. HOTHERSALL   2,187,740
APPARATUS FOR PRODUCING CAN BODIES
Filed May 9, 1936   3 Sheets-Sheet 1
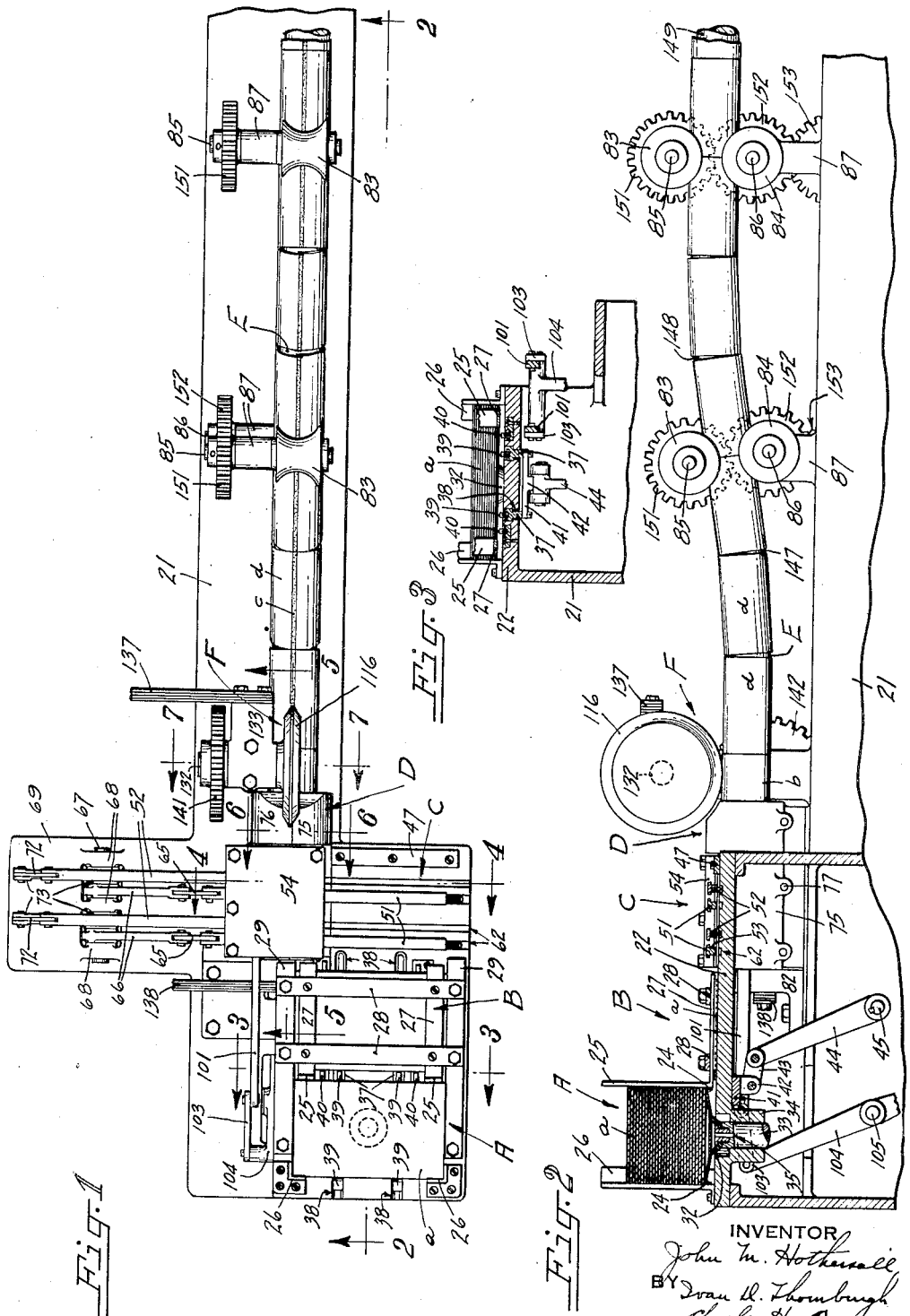

Jan. 23, 1940.　　　　J. M. HOTHERSALL　　　　2,187,740
APPARATUS FOR PRODUCING CAN BODIES
Filed May 9, 1936　　　3 Sheets-Sheet 2
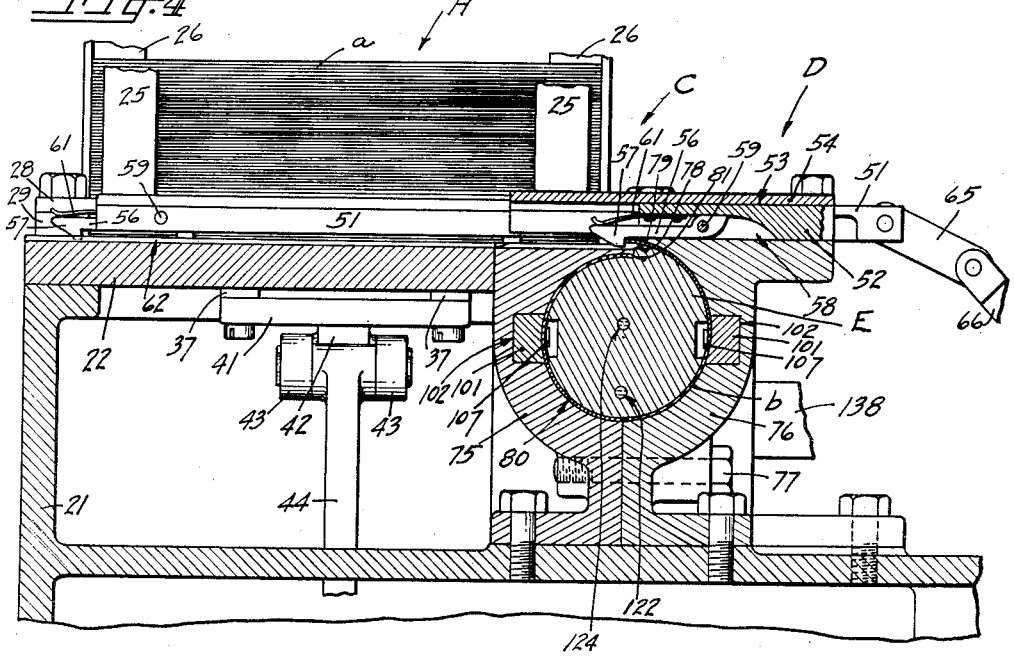
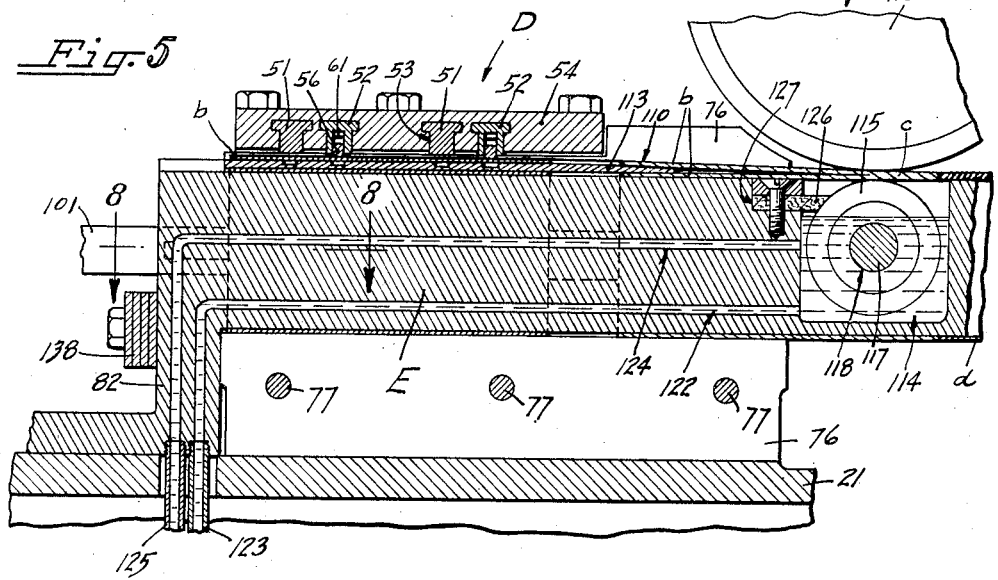
INVENTOR
John M. Hothersall
BY
ATTORNEYS Jan. 23, 1940. J. M. HOTHERSALL 2,187,740
APPARATUS FOR PRODUCING CAN BODIES
Filed May 9, 1936 3 Sheets-Sheet 3
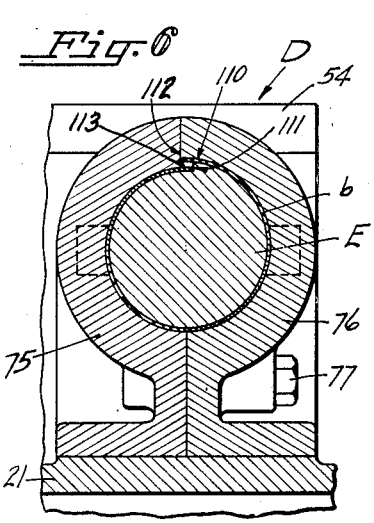
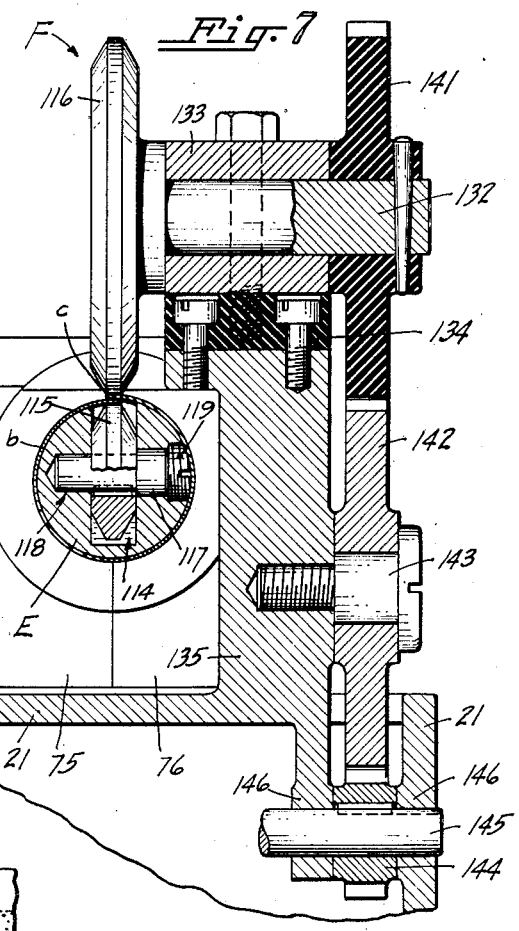
INVENTOR
John M. Hothersall
BY
ATTORNEYS Patented Jan. 23, 1940

2,187,740

UNITED STATES PATENT OFFICE 2,187,740

APPARATUS FOR PRODUCING CAN BODIES

John M. Hothersall, Brooklyn, N. Y., assignor to American Can Company, New York, N. Y., a corporation of New Jersey Application May 9, 1936, Serial No. 78,915

2 Claims. (Cl. 219—6)

The present invention relates to the manufacture of welded side seam metallic container or can bodies and has particular reference to an apparatus for welding the side seams so that the effect of extrusion of the metal at the seam ends, which is inherent in continuous seam welding, will be nullified.

In the making of cans any unevenness in the top and bottom edges of the can body especially at the ends of the side seam prevents proper seating of the end closures when they are applied and hence manufacturing difficulties are greatly increased. Welded side seam bodies are particularly open to this difficulty inasmuch as the usual continuous welding of the seam extrudes the metal and forms a projection which extends beyond the end edges of the body and causes an objectionable unevenness.

This extrusion or projection of metal may be said to be inherent in continuous resistance spot or stitch welding because the application of the full force of welding heat and pressure at the extreme ends of the overlapped parts of the seam results in too great a concentration of heat and pressure in too small an area. In other words the end stitches or spots of the weld are so close to the ends of the seam that extrusion of metal necessarily follows. It is to the overcoming of this difficulty while still utilizing the continuous welding principle that the present invention is particularly directed.

An object, therefore of the present invention is the provision of an apparatus for producing continuous resistance stitch or spot welded side seam can bodies by continuing the welding operation without interruption on succeeding can bodies as by holding adjacent can body edges together during their welding so that there results a continuous unbroken side seam extending from body to body, the individual bodies being tacked together without metal extrusion.

Another object of the invention is the provision of an apparatus for producing such welded can bodies wherein adjacent can bodies tacked together at the side seam ends by the welding operation are separated into individual units by breaking across the tacked connection in a clean line of severance thus nullifying any seam extrusion effect within the tacked connection.

A further object is the provision of an apparatus for producing non-extrusion welded side seam metallic can bodies in a series of steps which progressively transform flat can body blanks into completely formed and welded side seam can bodies which are free from metal extrusions at the ends of their side seams.

Another object is the provision in an apparatus of this character of a double acting can body blank feeding device which insures the proper rapid feeding of successive body blanks in close succession for the welding operation.

Still another object is the provision in such an apparatus of means for cooling a movable confined electrode while utilizing the cooling medium for increasing the electric conductivity of such electrode.

Numerous other objects and advantages of the invention will be apparent as it is better understood from the following description, which, taken in connection with the accompanying drawings, discloses a preferred embodiment thereof.

Referring to the drawings:

Figure 1 is a plan view of one form of apparatus embodying the present invention and utilizing the method steps thereof, parts being broken away;

Fig. 2 is a composite longitudinal elevation and sectional view taken substantially along the line 2—2 in Fig. 1, parts being broken away;

Fig. 3 is a transverse sectional view taken substantially along the line 3—3 in Fig. 1, with parts broken away;

Figs. 4 and 5 are enlarged fragmentary sections, Fig. 4 being a transverse view taken substantially along the line 4—4 in Fig. 1, and Fig. 5 a longitudinal view taken substantially along the line 5—5 in the same figure;

Figs. 6 and 7 are enlarged sectional details taken substantially along the lines 6—6 and 7—7, respectively, in Fig. 1, with parts broken away;

Fig. 8 is a fragmentary sectional detail taken substantially along the line 8—8 in Fig. 5; and Figs. 9, 10, 11 and 12 are enlarged fragmentary views of the side seams of can bodies before and after welding and illustrating the results of some of the method steps of the instant invention, Fig. 9 showing two adjacent can bodies with their side seams in end to end contact ready for welding, Fig. 10, illustrating the bodies and their seams after welding and showing how the individual bodies are tacked together, Fig. 11 showing the tacked connection of the bodies weakened by a bending of the seam, and Fig. 12 depicts the welded bodies broken apart.

In producing can bodies in accordance with the method steps of the instant invention flat metallic body blanks *a* (Figs. 1 and 2) are preferably fed individually from a stack of blanks supported in a magazine A. Each body is moved through two idle stations B, C, and is then introduced into a body forming shell D where it is shaped into a can body form with its side edges overlapped. While the blank is being bent into its body shape within the forming shell D it is wrapped around a mandrel E one end of which is disposed centrally of the forming shell.

The formed body is then moved endwise along the mandrel toward a welding station F where continuously rotating roller electrodes arranged adjacent the mandrel, perform the welding of the overlapped edges of the body thus forming its side seam.

Just prior to the welding of the overlapped edges of the body these edges are brought into engagement with gauging members which expand and size the body to its proper diameter while bringing the overlapped edges into seam engagement. This gauging continues to positively hold the seam edges in proper alignment as the welding operation begins and further continues until the welding has proceeded far enough to overcome any danger from shifting.

In moving a formed body into the welding station its forward edge is first brought into edge to edge contact with the rear edge of the preceding body which is then being welded and further advancement continues along the mandrel in time with the travel of the preceding body so that welding continues without interruption and a welding bond is formed between the seams of the two contacting bodies. In this manner a continuous procession of formed bodies moves through the welding station and individual bodies are tacked together as links in a chain.

After leaving the welding station the chain of connected bodies passes along a curved section of the mandrel and at such time the bodies are broken apart into separate units. Movement of the bodies along this section bends the body chain at the tacked connections, first weakening the latter and finally breaking them along a clean line of severance without any extrusion of metal at the seam ends. Such smooth edged bodies are in proper condition for the application of one or both of their end closures or for any other purpose.

A preferred form of apparatus embodying the invention and for performing the method steps thereof is disclosed in the drawings and includes a main frame 21 (Figs. 1, 2 and 3) which supports most of the operating parts of the apparatus. One end of the frame is provided with an elevated table 22 on which the blank magazine A is located.

The magazine A is of the usual construction commonly used in can making machinery and is used for supporting a stack of the flat body blanks a spaced above the top of the table 22. Edges of the blanks rest on lugs 24 formed on front and rear vertical uprights 25, 26 which are arranged adjacent corresponding edges of the blanks for maintaining the latter in vertical alignment in the magazine.

The rear uprights 26 are bolted directly to the top of the table 22 while the front uprights 25 are provided with horizontal extensions 27 which extend longitudinally of the table in front of the magazine and are spaced above the top thereof to permit passage of a blank thereunder and to prevent vertical displacement of the blank during such passage. These extensions are secured to cross bars 28 the ends of which are bolted to spaced and parallel longitudinal guide rails 29 which are disposed along opposite sides of the table adjacent the ends of the blanks in the magazine.

Individual blanks a are withdrawn from the bottom of the stack by a suction cup 32. This cup is secured to the upper end of a vertically movable rod 33 which is centrally disposed under the magazine and is carried in a bearing 34 formed in the table 22. A central passageway 35 extending through the rod and communicating with the cup is connected in any suitable manner with a source of vacuum supply for creating a vacuum in the cup in the usual manner. The rod is reciprocated by any suitable means, in time with other moving parts of the apparatus, to raise the cup into engagement with the lowermost blank and pull it down to a position on top of the table, between the guide rails 29.

Below the magazine A a pair of spaced and parallel feed bars 37 (Figs. 1 and 3) are located in T slots 38 formed in the table 22 and these feed bars carry spring held dogs 39 which engage behind a released blank and advance it longitudinally across the table when the bars are moved in a forward direction. Stationary dogs 40 disposed in the table 22 operate in the usual manner to prevent return of the blank when the bars are returned.

The feed bars 37 are moved in unison, being tied together by a plate 41 (see also Fig. 4) having a depending lug 42 connected by links 43 to one end of an arm 44. The arm is mounted on a horizontal shaft 45 carried in suitable bearings formed in the frame 21. This shaft is rocked in any suitable manner in time with the other moving parts of the apparatus to swing the arm 44 and hence to horizontally reciprocate the feed bars in their slots. On the forward strokes of the feed bars a released blank a is further advanced into an idle station B and then into a station C where it is brought to rest against a stationary guide rail 47. This rail aligns the blank with a transverse feed device which introduces the blank endwise into the forming shell D.

The transverse feed device is of double acting construction and comprises two sets of spaced and parallel feed slides 51, 52 (Figs. 1, 2, 4 and 5) arranged in pairs above the table 22 at station C and are parallel with the guide rail 47. These slides move in T shaped grooves 53 cut in the bottom of a plate 54 which is mounted on top of the forming shell D.

At the forward end of each slide 51, 52 a dog 56 having a hook end 57 is disposed in a channel 58 and is utilized for engaging behind a blank positioned at the station C. The dogs advance the blank into the shell D when the slides are moved in the proper direction. Each dog is carried on a pivot pin 59 and is held down in blank engaging position (as shown in Fig. 4) by a compression leaf spring 61, one end of which is housed in the channel 58 where it is secured in place by screws. Grooves 62 cut in the top of the table permit the hook end of each dog to extend below the surface of the table to properly engage behind a blank to be fed.

The opposite ends of the feed slides 51 are connected to links 65 which in turn are connected to one end of a pair of levers 66 freely mounted on a stationary shaft 67 carried in bearings 68 formed in an extension 69 of the main frame 21. Similarly the feed slides 52 are secured to links 72 which are connected to ends of a pair of levers 73 loosely mounted on the shaft 67 adjacent the levers 66. The pairs of levers 66, 73 are rocked simultaneously but in opposite directions so that the slides 51 are moved in one direction while the slides 52 are moved in an opposite direction.

For example while levers 73 are drawing the slides 52 toward the right (Fig. 4), as when moving a blank across the table 22 and into the shell D, the other levers 66 are pushing the slides 51 in the opposite direction across the table to bring their dogs 56 into position for engagement with the next blank being brought into the station C. This movement of the levers is effected by any suitable means actuated in time with the other moving parts of the apparatus. In this manner each blank *a* deposited at the station C is moved endwise by one or the other of the feed slides 51, 52 and is advanced into the forming means or shell D where it is preferably bent into cylindrical shape.

The forming shell D comprises a pair of vertically disposed half cylindrical moulds 75, 76 (Figs. 4, 5 and 6) which are secured together by bolts 77 to provide a hollow cylinder adapted to receive and shape the blanks *a*. This structure is supported on top of the frame 21 with the hollow cylinder disposed horizontally and adjacent the table 22 and in line with the discharge end of the transverse feed device. A horizontal opening 78 in the top of the shell and extending longitudinally at the joint between the moulds, provides an entrance through which a blank fed by the slide 51 or by the slide 52 is pushed into the hollow cylinder.

The top of the half mould 75 is flat and provides a continuation of the table 22 this flat part terminating at the entrance opening 78. The top of the half mould 76 is also flat and supports the plate 54 hereinbefore mentioned. The top of this latter half mould is slightly higher than the top of the half mould 75 and is formed with a laterally extending shelf 79 which overhangs the entrance 78 and directs a fed blank into the interior or hollow cylinder of the shell D. A blank thus fed into the shell through the opening 78 engages the cylindrical interior wall of the shell and is bent into conformity therewith producing a formed blank or partially completed can body *b* which is open along the side seam but which has its side edges in overlapping relation.

During insertion of the blank *a* into the shell D it is wrapped around the mandrel E passing at such time through a clearance space 80 (Fig. 4) between mandrel and shell. A step 81 is provided in the top of the mandrel and the forward edge of the moving blank is brought against this step which serves as a stop for properly locating each blank in the same relative position with their overlapped edges in correct longitudinal alignment.

The mandrel E is supported on top of the frame 21. Adjacent the shell D the mandrel is formed with a depending foot member 82 (Fig. 5) which is bolted to the top of the frame. At intervals along its length the mandrel is further retained in position by pairs of upper and lower rollers 83, 84 which are formed with concave faces in order to prevent lateral movement of the mandrel. These rollers are mounted on shafts 85, 86 carried in suitable bearings formed in bearing blocks 87 carried on top of the frame 21.

Provision is made for moving the formed blank *b* endwise or longitudinally along the mandrel E. This movement is effected by a pair of mandrel feed bars 101 (Figs. 1, 2, 3, 4 and 8) which are disposed on opposite sides of the mandrel in grooves 102 formed in the inside wall of the half moulds 75, 76. The feed bars are connected by links 103 to one end of a lever 104 mounted on a shaft 105 carried in suitable bearings formed in the frame 21.

The lever 104 is actuated by any suitable means operating in time with other moving parts of the apparatus to reciprocate the feed bars 101 on a forward or feeding stroke and thence backward on a return stroke. On the forward stroke of the feed bars spring held feed dogs 107 mounted on pivot pins 108 located in recesses 109 formed in the bars, engage behind a formed blank *b* and advance it along the mandrel.

During this movement of the formed blank *b* its overlapped side edges are moved along guiding steps 111, 112 (Fig. 6) which expand the body to its proper diameter and shift the overlapping edges into a desired amount of overlap for joining in the side seam. For this purpose the lower of the overlapped edges is guided by the step 111 which is a continuation of the stop step 81. The upper edge is guided by the step 112 which is formed in the upper part of the half mould 75 and which constitutes a section of the closed joint between the moulds 75, 76 at this end of the shell D.

The overlapped edges of the formed blank *b* are kept separated by a tongue or projection 113 formed on the mould 75. This projection tapers off in the direction of movement of the blank along the mandrel and terminates just short of the end of the shell D. Above the tapered portion of the tongue 113 the wall of the half mould 76 slopes down parallel with the tongue and provides a guide wall 110 which progressively forces the upper of the overlapped edges of the blank into engagement with the lowermost edge while still being guided and while the blank is being moved out of the shell.

Before the partially formed can body *b* is completely out of the shell D and while its overlapped edges are being progressively brought together for welding into a side seam, the body is brought into end to end contact with a body being welded at the welding station F and is moved along with this latter body into the welding station as the welding operation proceeds.

The welding station F is located adjacent the end of the shell D and a pair of vertically disposed lower and upper roller welding electrodes 115, 116 (Figs. 1, 2, 5 and 7) are located at the welding station. These electrodes weld the overlapped edges of the body in a side seam *c* (Figs. 5 and 10) and hence transform the partially formed can body *b* into a fully formed or welded side seam can body *d*.

Lower electrode 115 engages the seam on the inside of the body. For this purpose it is located in a recess or well 114 formed in the top of the mandrel E and is mounted on a short shaft 117 carried in a horizontal bore 118 formed in the side of the mandrel. A headless set screw 119 threaded into the open end of the bore confines the shaft against lateral displacement.

To prevent excessive heating of the confined electrode 115 and to effect a greater electrical contact between the roller and its adjacent parts, a fluid such as, for example, water, is forced into the well 114 through a passageway 112 (Fig. 5) formed in the mandrel E. The opposite end of this passageway communicates with a conduit 123 which leads from a suitable source of liquid supply.

A second passageway 124 also formed in the mandrel and leading from the well 114 provides a return outlet for the water. The passageway 124 communicates with a conduit 125 which carries the surplus heated water to a suitable place of discharge. Water in the well is prevented from being carried up into contact with the moving can body when the electrode is rotated through frictional engagement therewith, by a scraper 126 which is clamped in a recess 127 formed in the mandrel adjacent the well.

The upper welding electrode 116 engages the can body seam on the outside and is located directly above the electrode 115 and is mounted on a shaft 132 (Fig. 7). The shaft is journaled in a bearing 133 bolted to an insulating pad 134 which is secured to a bracket 135 formed on top of the frame 21. Electric energy from any suitable source of supply such as, for example a generator or power line, is continuously transmitted through the roller electrodes 115, 116 by way of buss bars 137, 138 (Figs. 1, 2, 4 and 5) and by way of certain intermediate parts.

Buss bar 137 is connected to the bearing 133 while the bar 138 is secured to the foot member 82 of the mandrel E. Thus electric current is conveyed from the buss bar 137, through the bearing 133, shaft 132, electrode 116, can body seam c, electrode 115, water in the well 114 and shaft 117, mandrel E, returning to its source through the buss bar 138.

Upper electrode 116 is continuously rotated during the welding of the can body seams by a driven gear 141 which is mounted on the electrode shaft 132 and is preferably made of insulating material. This gear meshes with an idler gear 142 which is carried on a stud 143 threaded into the side of the bracket 135 and which is driven by a driving pinion 144 keyed to a shaft 145 journaled in bearings 146 formed in the frame 21. The shaft 145 is continuously rotated in any suitable manner in time with the other moving parts of the apparatus. The continuous rotation of the upper electrode and the pressure exerted by it on a can body being welded propels the body along the mandrel by frictional engagement and at the proper welding speed.

To effect a continuous operation of the welding electrodes and to nullify the effect of extrusion of the metal at the ends of the seams each partially formed can body b is passed along the mandrel E from the forming shell D in quick succession so as to present a continuous procession of bodies moving past the welding electrodes.

This movement, from forming shell to electrodes, of each partially formed body is such as to cause it to catch up with the preceding body. Its forward edge is thereupon brought into end to end contact with the rear edge of the body being welded. The engaged bodies have their side seams in longitudinal alignment, as shown in Fig. 9. They are held in such contact by the feed bars 101 until each body is engaged by the electrodes so that the welding operation is continued from the seam of one body being welded, through and into the seam of each following contacting body.

This uninterrupted welding operation with the attendant contact between the bodies and with the accompanying pressure and welding heat of the electrodes, causes a portion of the fused metal of the seam of a preceding can body to be carried over in effect into the seam of a following can body thus tying or uniting adjacent bodies together in a tacked connection as shown schematically in Fig. 10. This tacking action does not result in an extrusion of the metal because there is no space between the bodies during the welding operation into which the metal may be extruded. Hence the effect of extrusion is nullified and replaced by a mere tacking together of the seam ends.

The tacked connection between joined bodies is next broken to sever the bodies into separate units. This is effected by passing the procession of connected bodies along a curved section of the mandrel. The mandrel, forward of the welding station, extends upwardly in a curved zone 147 (Fig. 2) and then curves outwardly as at 148 into a straight section 149 which leads to a suitable place of discharge for the bodies.

The procession or chain of bodies moving along the curved section 147 is thus first bent at each tacked joint which draws the bodies apart at the bottom of the mandrel as shown in Fig. 2. This bending action weakens the tacked junctions as shown in Fig. 11.

As the chain of bodies passes along the curved mandrel section 148 each weakened connection is bent in the opposite direction which action brings adjacent bodies together at the bottom of the mandrel and tends to pull apart or separate them at the top of the mandrel. This breaks the tacked connections in a clean line of severance as shown in Fig. 12 and produces a plurality of separate bodies. The ends of the side seams of the bodies are thus free from any extrusions or projections and there is thus removed the usual hazards encountered in subsequent can making operations.

Although the drawings show only one pair of curved sections 147, 148 of the mandrel E for weakening and breaking the tacked connections between the bodies it should be understood that the mandrel may be formed with a plurality of these curved sections to repeat and further accentuate weakening and breaking of the connections between the bodies should such conditions be desirable.

During the travel of the chain of bodies along these curved sections of the mandrel the propelling force of the upper electrode 116 is augmented by frictional engagement between the bodies and the mandrel supporting rollers 83, 84. These rollers are positively rotated being geared together by spur gears 151, 152 (Figs. 1 and 2) which are mounted on the respective shafts 85, 86. The gear train may be driven by driving gears 153 suitably supported in the frame 21. Gears 153 are exemplary of any suitable driving means which operate in time with the other moving parts of the apparatus to rotate the mandrel supporting rollers 83, 84 at a proper rate of movement and hence assist in propelling the chain of bodies along the mandrel.

It is thought that the invention and many of its attendant advantages will be understood from the foregoing description, and it will be apparent that various changes may be made in the form, construction and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. An apparatus for making sheet metal can bodies having non-extrusion welded side seams, comprising a mandrel for interiorly supporting a can body, welding elements for welding the side seam of said body while on said mandrel, means for bringing a second and unwelded can body into end engagement with the can body being welded and for presenting the same to said welding elements while in such end engagement so that both bodies are tacked together in a single line of weld, said mandrel being continuous and disposed at different angles at points remote from said welding elements to adapt the same for breaking across said tacked connection in a clean line of severance as the can bodies are moved along and supported by said mandrel.

2. An apparatus for making sheet metal can bodies having non-extrusion welded side seams, comprising a mandrel for interiorly supporting a can body, rotating welding elements for welding the side seam of said body while on said mandrel, means for bringing a second and unwelded can body into end engagement with the can body being welded and for presenting the same to said welding elements while in such end engagement so that both bodies are tacked together in a single line of weld, said mandrel being continuous and having an intermediate portion at a point remote from said welding elements disposed at an angle to the normal axis of the mandrel to adapt the same for first bending across said tacked connection to weaken the same and then bending in the opposite direction across said tacked connection to break the same in a clean line of severance, whereby to separate said can bodies from one another as the same are moved along and supported by said mandrel.

JOHN M. HOTHERSALL.